United States Patent [19]

Shiki et al.

[11] 3,920,575

[45] Nov. 18, 1975

[54] GAS GENERATING COMPOSITION AND METHOD OF PREPARING COMPRESSION MOLDED ARTICLES THEREFROM

[75] Inventors: Takehiko Shiki, Nobeoka; Ikuo Harada, Higashikurume; Tadamasa Harada, Ooita; Masaaki Shiga, Tokyo, all of Japan

[73] Assignee: Asahi Kasei Kogyo Kabushiki Kaisha, Tokyo, Japan

[22] Filed: Feb. 21, 1974

[21] Appl. No.: 444,607

[30] Foreign Application Priority Data

Mar. 3, 1973 Japan.............................. 48-25524
Mar. 3, 1973 Japan.............................. 48-25525
Mar. 3, 1973 Japan.............................. 48-25526

[52] U.S. Cl................ 252/188.3; 149/35; 264/3 C; 280/150 AB
[51] Int. Cl.² C06B 35/00; C06B 21/00; C06D 5/06
[58] Field of Search........... 252/350, 188.3; 149/35; 264/3 C, DIG. 5; 280/150 AB

[56] References Cited
UNITED STATES PATENTS
3,718,513  2/1973  Baer et al. ....................... 149/35 X
FOREIGN PATENTS OR APPLICATIONS
7,446,587  5/1974  Japan

*Primary Examiner*—Benjamin R. Padgett
*Assistant Examiner*—David Leland
*Attorney, Agent, or Firm*—Burgess, Dinklage & Sprung

[57] ABSTRACT

A gas generating composition comprising:

I. at least one metal azide compound selected from the group consisting of alkali metal azides, alkaline earth metal azides and hydroxy metal azides having the general formula
$M(OH)_m(N_3)_n$
wherein
M represents magnesium, calcium, strontium, zinc, boron, aluminum, silicon, tin, titanium, zirconium, magnesium, chromium, cobalt or nickel;
$(m + n)$ represents an atomic valency of M; and $m$ and $n$ represent a positive number, respectively, II. at least one oxidizing agent or a combustion composition comprising at least one oxidizing agent and at least one reducing agent; and III. at least one compound selected from the group consisting of a compound of the formula
$(Al_2O_3)_p(M_xO)_q(SiO_2)_r \cdot sH_2O$
wherein
M represents lithium, sodium, potassium, strontium, magnesium or calcium; $x$ is 1 or 2; $p$ and $q$ represent zero or a positive number, respectively but $p$ and $q$ are not zero simultaneously; $r$ is a positive number; and $s$ is zero or a positive number, potassium chloride, potassium bromide, calcium chloride, sodium bromide, strontium chloride and strontium hydroxide, in an amount of from about 0.5 to 30 parts by weight based on 100 parts by weight of the total of the metal azide compound (I) and the oxidizing agent or the combustion composition (II).

The composition generates non-toxic molecular nitrogen gas and is especially effective for producing compression-molded articles such as tablets.

9 Claims, No Drawings

GAS GENERATING COMPOSITION AND METHOD OF PREPARING COMPRESSION MOLDED ARTICLES THEREFROM

BACKGROUND OF THE INVENTION

Recently, there has been considerable interest in developing a safety means to protect a passenger from impact of a high speed vehicle, such as an automobile. Other than a safety belt, there has been developed a protective bag system, in which a folded bag is quickly inflated and deployed, at the time of a crash impact of an automobile, to prevent a passenger in the automobile from being thrown violently against the steering wheel, dashboard or other automobile structure.

A gas generating chemical composition in a solid state is preferably used as one of the gas sources for inflation of the bag, because the volume required for containing the solid composition is smaller than that of a liquid or compressed gas, a pressure resisting vessel is not necessary, and the gas generating velocity can be easily controlled.

There has already been provided by the same inventors of this invention a gas generating chemical composition comprising (I) at least one metal azide compound selected from the group consisting of alkali metal azides, alkaline earth metal azides and hydroxy metal azides having the general formula $M(OH)_m(N_3)_n$, wherein M represents magnesium, calcium, strontium, zinc, boron, aluminum, silicon, tin, titanium, zirconium, magnesium, chromium, cobalt or nickel, $m$ plus $n$ represents atomic valency of M, and $m$ and $n$ represent a positive number respectively, and (II) at least one oxidizing agent or a combustion composition comprising at least one oxidizing agent and at least one reducing agent (DOS 2325310). These metal azide compounds generate not only a large amount of non-toxic molecular nitrogen gas alone by decomposition but also they are stable in the temperature range of use and have appropriate decomposability by ignition. However, of these metal azides the alkaline earth metal azides are remarkably sensitive to friction and impact or shock and ready to ignite in some cases and thus the handling thereof requires the greatest precaution. Additionally, many of the oxidizing agents and combustion compositions which are incorporated into the gas generating composition in order to obtain a controlled gas generating velocity, are highly sensitive to friction and impact in themselves. Accordingly, the addition of the alkaline earth metal azide results in all the more increasing the sensitivity of the gas generating composition to friction and impact. Thus, even when the alkali metal azides and hydroxy metal azides of comparatively low sensitivity are employed, the gas generating composition comprising an oxidizing agent or a combustion composition is increased in sensitivity to friction and impact, often causing troublesome problems in the handling thereof.

In order to keep the gas generating velocity constant it is necessary that the components of gas generating compositions are molded into shaped articles. Since there is a high probability that the gas generating composition is exposed to severe vibrations and severe temperature changes occurring over a long period of time during storage in an automobile, it is desirable that the shaped articles are firm and durable from the point of view of not causing a fluctuation of the gas generating velocity over a long period of time. As for the method of molding gas generating compositions it may be judged that compression molding such as tableting is most preferred to produce articles having a definite firm and durable shape. But when a powdered composition consisting of at least one metal azide compound and at least one oxidizing agent is compression-molded by a tableting machine, the composition ordinarily ignites due to the friction between the lateral surface of a tablet and that of a mortar at the time of discharging a tablet by a downward pestle after compression. Even by using special combinations of the metal azide compounds and oxidizing agents, the resulting tablets lack uniformity of hardness. Also the phase separation of tablets and the breaking-off of the upper edge of tablets are observed and thus it is very difficult to obtain tablets in the perfect shape.

Also there has been provided by two of the same inventors of this invention a method of preparing shaped articles which comprises adding 0.05 to 5 parts by weight of a rubber type high molecular weight compound having rubber-like elasticity to 100 parts of the gas generating composition as above-described. This method is effective for very safely producing shaped article having good hardness but when a gas is generated by combustion of the tablets obtained from the gas generating composition, cyanide compounds having high toxicity are detected in the combustion residue. Although when silicon resins are employed as the rubber type compound the amount of cyanides is very minute the generation of cyanides even in a minute amount should be prevented.

THE INVENTION

In accordance with this invention, there is provided a gas generating composition comprising:

I. at least one metal azide compound selected from the group consisting of alkali metal azides, alkaline earth metal azides and hydroxy metal azides having the general formula
   $M(OH)_m(N_3)_n$
   wherein
   M represents magnesium, calcium, strontium, zinc, boron, aluminum, silicon, tin, titanium, zirconium, magnesium, chromium, cobalt or nickel;
   $(m + n)$ represents an atomic valency of M; and $m$ and $n$ represent a positive number, respectively, II. at least one oxidizing agent or a combustion composition comprising at least one oxidizing agent and at least one reducing agent; and III. at least one compound selected from the group consisting of a compound of the formula
   $(Al_2O_3)_p(M_xO)_q(SiO_2)_r.sH_2O$
   wherein
   M represents lithium, sodium, potassium, strontium, magnesium or calcium; $x$ is 1 or 2; $p$ and $q$ represent zero or a positive number, respectively but $p$ and $q$ are not zero simultaneously; $r$ is a positive number; and $s$ is zero or a positive number, potassium chloride, potassium bromide, calcium chloride; sodium bromide, strontium chloride and strontium hydroxide, in an amount of from about 0.5 to 30 parts by weight based on 100 parts by weight of the total of the metal azide compound (I) and the oxidizing agent or the combustion composition (II).

The gas generating compositions of this invention generate substantially only non-toxic gases and combustion residues, and the decomposition thereof can be effected with such a controlled velocity as to cause a protective bag to inflate in a period of time of the order of 20 to 80 milliseconds from the moment of a crash impact of a high speed vehicle such as an automobile; also the gas generating compositions do not ignite by friction and impact during molding, and can give gas generating shaped articles such as tablets which withstand severe vibrations and temperature changes when stored in an automobile for a long period of time.

Exemplary alkali metal azides and alkaline earth metal azides include lithium azide, sodium azide, potassium azide, magnesium azide, calcium azide, strontium azide and barium azide. The hydroxy metal azides represented by the formula $M(OH)_m(N_3)_n$ include, for example, $Mg(OH)_{1.2}(N_3)_{0.8}$, $Al(OH)_{1.2}(N_3)_{0.8}$ and $Ca(OH)_{1.1}(N_3)_{0.9}$ and can be prepared as a solid powder by a process comprising adding dropwise concentrated $H_2SO_4$ to boiling sodium azide aqueous solution to generate hydrogen azide, causing the hydrogen azide to be dissolved in cooled water, then adding metal hydroxide to the resulting aqueous solution, and thereafter evaporating water and an excess of hydrogen azide therefrom. Thus, by introducing the hydroxy group into metal azides to replace a part of the metal with a hydroxy group, there can be also employed a metal which can not be employed as the metal azide because of its oversensitiveness to heat and shock.

Of the above-described metal azide compounds especially strontium azide, barium azide and sodium azide are excellent in not bringing about explosive combustion or violent combustion in a closed vessel and in thermal stability.

Examples of suitable oxidizing agents include halogenoacid salts such as lithium perchlorate, potassium perchlorate, ammonium perchlorate, sodium perchlorate, potassium chlorate and potassium bromate; nitrates such as potassium nitrate and barium nitrate; metal peroxides such as lithium peroxide, sodium peroxide, potassium peroxide, barium peroxide, lead peroxide; metal oxides such as manganese dioxide, trilead tetraoxide, lead oxide, chromium trioxide, ferric oxide ($Fe_2O_3$) and ferrosoferric oxide ($Fe_3O_4$). Mixtures of these compounds may also be employed. Of these oxidizing agents potassium perchlorate, potassium nitrate, ferric oxide and ferrosoferric oxide are preferably employed from the view point of non-toxicity, non-hygroscopicity, chemical stability and thermal stability.

The combustion compositions which are employed together with the metal azide compounds comprise at least one oxidizing agent as described above and at least one reducing agent.

Exemplary reducing agents include metals such as zirconium, magnesium, boron, aluminum, silicon, ferro-silicon, titanium and manganese.

The combustion composition may additionally contain powers such as black powder, smokeless powder, picric acid and trinitrotoluene; and mixtures of a variety of polymers and an oxidizing agent in such an amount as not to greatly affect the gas generating composition, the gas generating temperature and the combustion residue of the gas generating composition.

The amount of the oxidizing agent or the combustion composition may vary depending upon such factors that the oxidizing agent and combustion composition selected do not generate a toxic gas and that the gas generating temperature does not rise too high, i.e., below about 1,500°C. Generally, however, the amount is in the range of from about 1 to 50 parts by weight based on 100 parts of the metal azide compound.

The amount of the compound (III) may vary depending upon such factors as the metal azide compound, oxidizing agent or combustion composition chosen, the ratio of the metal azide compound to the oxidizing agent or combustion composition employed. Typically, however, the amount is in the range of from about 0.5 to 30 parts by weight based on 100 parts of the total of the metal azide compound and the oxidizing agent or combustion composition. When the amount is less than 0.5 part by weight, the desired effects are hardly realized. On the other hand, amounts of more than 30 parts by weight disadvantageously increase the volume and weight of the gas generating composition since the compound (III) per se does not generate a gas.

The optimum particle size of the compound (III) varies depending upon the kind and size of the metal azide, oxidizing agent or combustion composition and other additives chosen. Generally as the particle size is smaller than desired effects increase.

The compounds of the formula $(Al_2O_3)_p(M_xO)_q(SiO_2)_r.sH_2O$ may be natural compounds or synthetic compounds and include, for example, concentrated aqueous solutions or solids of alkali-silicate glass such as $(Na_2O)_q(SiO_2)_r.sH_2O$, $(K_2O)_q(SiO_2)_r.sH_2O$, $(Li_2O)_q(SiO_2)_r.sH_2O$ wherein $r/q$ is 1 to 4 and preferably 2 to 4; $(Al_2O_3)_p(SiO_2)_r.sH_2O$; $(MgO)_q(SiO_2)_r.sH_2O$; $(Al_2O_3)_p(MgO)_q(SiO_2)_r.sH_2O$, $(Al_2O_3)_p(K_2O)_q(SiO_2)_r.sH_2O$, $(Al_2O_3)_p(Na_2O)_q(SiO_2)_r.sH_2O$, $(Al_2O_3)_p(CaO)_q(SiO_2)_r.sH_2O$ and mixtures of these compounds. However, the addition of powdered $SiO_2$, i.e. $p=0$ and $q=0$ increases the friction sensitivity and impact sensitivity of the gas generating composition although moldability is improved. Especially when M is magnesium in the case of $p=0$, the moldability tends to reduce with increased amounts and the amount is preferably at most 5 parts. When $p$ is zero the particle size effect becomes remarkable.

Furthermore, the gas generating composition may contain binding agents such as rubber-like high polymers including butadiene rubbers, butadiene-styrene rubbers, and silicone rubbers, catalysts for promoting combustion and stabilizers.

In general, the gas generating compositions may be employed in the form of granules, pellets or tablets, and especially in the form of tablets, and tablets may be generally prepared by mixing the powdered components of the gas generating composition in their powdered state and compression-molding the resulting mixture to tablets by a tableting machine.

It has now been discovered that when water is added to the gas generating composition the resulting mixture can be molded into granules, and furthermore the granules from which water is removed by drying can be compression-molded into articles such as tablets having excellent hardness without ignition.

The amount of water may vary within wide limits depending upon such factors as the solubility of the gas generating composition in water and the method of preparing granules employed. Additionally, when the metal azide compound is resolved into water the metal is liable to be replaced with another metal and thus the metal azide compound becomes chemically unstable. Accordingly smaller amounts of water are preferred. Typically the amount is in the range of from about 7 to 300 parts by weight based on 100 parts of the gas generating composition.

In order to further increase the chemical stability of the metal azide compounds it is preferred to employ an organic medium soluble in or miscible with water in an amount of from about 7 to 300 parts by weight based on 100 parts of the gas generating composition.

The addition to the organic medium to water can bring the hardness of granules of the gas generating composition to the most preferred valve required for compression molding. Thus, the phase separation of compression-molded articles such as tablets and the breaking-off of the edge of the compression-molded articles can be advantageously prevented.

Examples of suitable organic media include aliphatic alcohols having 1 to 6 carbon atoms such as methyl alcohol, ethyl alcohol, n-propyl alcohol, isopropyl alcohol, n-butyl alcohol, n-hexyl alcohol; aliphatic ketones having 3 to 5 carbon atoms such as acetone, methylethyl ketone, diethyl ketone; and aliphatic ethers having 2 to 5 carbom atoms such as methyl ether, ethyl ether, methylethyl ether.

The metal azide compound is slightly unstable to water and considerably unstable to acidity. Also when the metal azide compound in the moistened state is contacted with a metal such as copper, lead or silver or alloys thereof, the decomposing odor of the metal azide compound is smelled, and the discoloration of the metal azide compound is observed. Accordingly, the contact of the azide metal compound with such metals or alloys in the course of forming granules and tablets should be avoided as much as possible. However, it has also been discovered that when an alkaline compound is added to water or a mixture of water and the organic medium the decomposing odor and discoloration of the metal azide compound can be reduced.

Exemplary alkaline compounds include lithium hydroxide, sodium hydroxide, potassium hydroxide, strontium hydroxide, barium hydroxide, lithium carbonate, sodium carbonate, potassium carbonate, strontium carbonate, lithium hydrogenbicarbonate, sodium hydrogenbicarbonate and potassium hydrogenbicarbonate.

The amounts of the alkaline compound are preferably about 0.1 to 5 parts by weight based on 100 parts by weight of the gas generating composition.

Any conventional methods of forming granules from the gas generating composition by adding water or a mixed solution of water and the organic medium may be employed. For example, water or a mixed solution of the organic medium is uniformly added to the powered components of the gas generating composition by a spray or other means, and the resulting mixture is thoroughly mixed while controlling the viscosity of the mixture and then passed through a wire gauze made of metal or fiber or a plate having a plurality of holes by pressure to give granules. Also the powered gas generating composition is in its moistened state extruded through a slit or a plate having a plurality of holes by an extruder. Or there may be employed a fluidized granulating method of floating the powdered gas generating composition by blowing air and spraying thereto water or a mixed solution of water and the organic medium to form granules. The alkaline compound may be either mixed with the gas generating composition prior to granulation or dissolved in water or a mixed solution of water and the organic medium.

Then, the granules are dried at a temperature of from room temperature to about 120°C. for 10 minutes to 48 hours. The maximum particle size of granules for compression molding is preferably 10 "Tyler mesh".

The granules thus obtained are subjected to compression molding at a pressure of typically about 50 Kg. to 20,000 Kg. per tablet, and preferably about 100 Kg. to 1,000 Kg. per tablet to give tablets.

This invention will now be illustrated by the following examples, in which parts are all by weight unless expressly stated to the contrary.

EXAMPLE 1

95 parts of strontium azide, 5 parts of potassium perchlorate, 5 parts of magnesium aluminum silicate $Al_2O_3$(=31 wt. %).$MgO$(=10 wt. %).$SiO_2$(=36 wt. %).$H_2O$(=23 wt. %) and 20 parts of water were thoroughly mixed in a stainless steel planetary mixer of the Shinagawa type for 5 minutes, and the resulting mixture was extruded through a 40 mesh stainless steel wire gauze to give granules. Then the granules were dried at 60°C. in a hot air drier for 3 hours. When a 40 mesh brass wire gauze was used instead of the stainless steel wire gauze the resulting granules were discolored yellow.

The granules were subjected to compression molding to give tablets of a diameter 5 mm. and a thickness 2 mm. by a rotary tableting machine (Model "RTS-9", manufactured by Kikusui Manufacturing Co., Ltd.) without any ignition. The tablets thus produced were slightly lacking in surface luster and the breaking-off of the edge of a very few of the tablets was observed, and the breaking strength of the tablets were 2.0 Kg.

In a 150 c.c. cylindrical iron combustion vessel, the side wall of which was perforated with 100 circular gas outlet holes of a diameter of 4 mm. in uniform intervals, the outside of the side wall being provided with a filter layer of 15 stainless steel wire gauzes of plain weave of 100 mesh, there were filled 200 g. of the tablets and two ignition tubes, each containing 0.2 g. of an ignition composition consisting of 15 wt. % of boron and 85 wt. % of potassium nitrate.

The resulting vessel was fixed in a folded cylindrical polycaprolactam bag having a volume of 70 liters and a direct current of about 2 amperes was flowed into the ignition tubes to ignite the ignition composition and then the gas generated composition, i.e., the tablets, so that gas was generated to inflate and deploy the bag.

According to a pressure-time curve in the bag, measured by a strain meter, the period of time until the inner pressure of the bag amounted to 0.2 Kg./cm$^2$. gauge was 30 milliseconds.

Then the combustion vessel was disassembled and the combustion residue was collected and the amount of cyanide ion was quantitatively analyzed according to the method JIS K0102 and was at most 0.2 p.p.m.

COMPARATIVE EXAMPLE 1

95 parts of strontium azide and 5 parts of potassium perchlorate were thoroughly mixed in a stainless steel pulverizing and mixing machine of the Ishikawa type for 30 minutes and the resulting mixture was subjected to compression molding to give tablets in the same manner as in Example 1. Three to four downward and upward reciprocating motions of pestles resulted in ignition and the breaking-off of the edge of the resulting tablets was observed.

COMPARATIVE EXAMPLE 2

95 parts of strontium azide, 5 parts of potassium perchlorate, 2 parts of a styrene-butadiene rubber in a mole ratio of styrene to butadiene of 40 to 60 and 100 parts of toluene were thoroughly mixed by a stainless steel pulverizing and mixing machine of the Ishikawa type for one hour and the resulting mixture was extruded through a 40 mesh stainless steel wire gauze to give granules. Then these granules were dried at 60°C. in a hot air drier for 3 hours.

These granules were subjected to compression molding to give tablets of a diameter 5 mm. and a thickness 2 mm. by the same rotary tableting machine as in Example 1 without any ignition. The tablets thus obtained had surface luster and the edge of the tablets were not broken off. The breaking strength of the tablets was 2.5 Kg.

In the same manner as in Example 1 the tablets were subjected to combustion and the amount of cyanide ion in the combustion residue was quantitatively analyzed and was 0.82 wt. %.

EXAMPLE 2

85 parts of strontium azide, 3 parts of boron, 12 parts of potassium nitrate, 5 parts of synthetic aluminum silicate $Al_2O_3(=9$ wt. %$).SiO_2(=51$ wt. %$).H_2O(=39$ wt. %), the alkaline compound, water and methyl alcohol in an amount set forth in Table 1 were thoroughly mixed in the same manner as in Comparative Example 1 and the each of the resulting mixtures was extruded through a 40 mesh brass wire gauze to give granules. Then these granules were dried in the same manner as in Example 1. The degree of discoloration of the granules are shown in Table 1. Further using these granules tablets were prepared in the same manner as in Example 1. The tabletability of the mixtures and breaking strength of the tablets are shown in Table 1.

COMPARATIVE EXAMPLE 3

85 parts of strontium azide, 3 parts of boron and 12 parts of potassium nitrate were thoroughly mixed in their powdered state, and the resulting mixture was subjected to compression molding in the same manner as in Example 1 to give tablets. Three to four downward and upward reciprocating motions of pestles resulted in ignition. The phase separation of the tablets and the breaking-off of the edge of the tablets were observed.

EXAMPLE 3

90 parts of strontium azide, 2 parts of zirconium, 8 parts of potassium nitrate, 8 parts of lithium silicate (made by Nisan Chemical Co., Ltd.), 30 parts of water and 70 parts of each of the organic media set forth in Table 2 were thoroughly mixed and using each of the resulting mixtures there were produced granules, and subsequently tablets therefrom in the same manner as in Example 1. The results are shown in Table 2.

EXAMPLE 4

90 parts of barium azide, 3 parts of boron, 7 parts of potassium perchlorate, 100 parts of water, water glass ("No. 3", made by Kishida Chemical Co., Ltd., $p=0$, $r/q=3.1$ to 3.3) in an amount set forth in Table 3 and 5 parts of lithium silicate were thoroughly mixed in a stainless steel pulverizing and mixing machine of the Ishikawa type for 30 minutes and then using the resulting mixture there were produced granules in the same manner as in Example 1.

These granules were subjected to compression molding to give tablets of a diameter 4 mm. and a thickness 3 mm. by a single-shot tableting machine (model "2B-T", manufactured by Kikusui Manufacturing Co., Ltd.). The results are shown in Table 3.

EXAMPLE 5

100 parts of strontium azide, 20 parts of water, 80 parts of methyl alcohol and water glass ("No. 2", made by Kishida Chemical Co., Ltd., $p=0$, $r/q=2.4$ to 2.6) in an amount set forth in Table 4 were thoroughly mixed for one hour in a stainless steel pulverizing and mixing machine of the Ishikawa type and each of the resulting mixtures was extruded through a cylinder having a plurality of perforated holes of a diameter of 1.5 mm. by an all purpose granulating machine for testing (model "HU-C.G.N.T.", manufactured by Hata Ironworks, Ltd.) to give granules. Then these granules were dried at 50°C. in a hot air drier for 5 hours.

These granules were molded into tablets of a diameter 6 mm. and a thickness 2.5 mm. by the same tableting machine as in Example 4. The results are shown in Table 4.

EXAMPLE 6

70 parts of sodium azide, 4 parts of boron, 27.5 parts of potassium perchlorate, 5 parts of the same synthetic aluminum silicate as in Example 2, 0.3 part of sodium carbonate and each of the mixed solutions of water and acetone in an amount set forth in Table 5 were thoroughly mixed in the same manner as in Comparative Example 1 and using each of the resulting mixtures there were produced granules, and subsequently tablets in the same manner as in Example 1. The results are shown in Table 5.

EXAMPLE 7

80 parts of strontium azide, 0.7 parts of boron, 2.3 parts of silicon, 13 parts of trilead tetraoxide, 4 parts of magnesium aluminum silicate ($Al_2O_3.MgO.2SiO_2.XH_2O$, made by Fuji Chemical Industry Co., Ltd.), 5 parts of the same water glass as in Example 5 and each of the mixed solutions of water and methanol in an amount set forth in Table 6 were thoroughly mixed in the same manner as in Comparative Example 1 and each of the resulting mixtures was extruded through a plate having a plurality of perforated holes of a diameter of 1.5 mm. by a granulating machine (model "EXD-60", manufactured by Fuju Powder Co., Ltd.) to give granules and then these granules were dried at 60°C. in a hot air drier for 3 hours. The resulting granules were molded into tablets of a diameter of 6 mm. and a thickness of 2.5 mm. by the same tableting machine as in Example 4. The results are shown in Table 6.

EXAMPLE 8

80 parts of strontium azide, 4 parts of boron, 16 parts of potassium perchlorate and 5 parts of synthetic aluminum silicate having passed a 325 mesh sieve (made by Takeda Chemical Industry Co., Ltd.) were thoroughly mixed in their powdered state and the resulting mixture was molded into cylindrical tablets of a diameter 5 mm. and a thickness 2 mm. by the same tableting machine as in Example 4 without any ignition during tableting. Slight sticking of the powered mixture to pestles was observed during tableting. The breaking strength of the resulting tablets was 2.0 Kg.

The friction sensitivity and hammer dropping impact sensitivity of the powered gas generating composition are shown in Table 7.

In a 150 c.c. cylindrical iron combustion vessel having a lid plate having 100 circular holes of a diameter of 4 mm. perforated in uniform intervals 200 g. of the tablets and one ignition tube were tightly packed, and the vessel was subjected to a vibration test for 20 hours at the maximum acceleration of 1960 cm./sec.$^2$ in a frequency of 15 Herz by a vibration tester (manufactured by Ito Precision Co., Ltd.). 0.5 weight percent of the total tablets passed through a 20 mesh sieve.

In a 150 c.c. cylindrical iron combustion vessel, the side wall of which was perforated with 100 circular gas outlet holes of a diameter 4 mm., and the outside of the side wall being provided with a layer of stainless steel wire gauzes set forth in Table 8, there were filled 200 g. of the tablets, two ignition tubes, each containing a tricinate head and 0.2 g. of boron and potassium nitrate in a weight ratio of 15 to 85. The vessel was placed in a folded cylindrical polycaprolactam bag having a volume of 70 liters and a direct current of about 2 ampere was passed through the ignition tubes to ignite the ignition composition and then the tablets, so that gas was generated to inflate and deploy the bag. The period of time until the inner pressure of the bag amounted to 0.2 Kg./cm$^2$. gauge was 22 milliseconds and the period of time until the inner pressure of the bag amounted to the maximum was 45 milliseconds.

Then the combustion vessel was disassembled and the combustion residue was collected and the amount of cyanide ion and metal residue were quantitatively analyzed. The results are shown in Table 9.

The gas composition in the bag after being deployed is shown in Table 10. The nitrogen, oxygen, carbon monoxide, methane and carbon dioxide were quantitatively analyzed by collecting the gas in the bag immediately after being deployed by a syringe and analyzing the gas by a gas chromatograph of the thermal conductivity type (made by Shimazu Manufacturing Co., Ltd.). In this case a column of active carbon is employed for carbon dioxide and a column of molecular sieve 5A is employed for the remaining gases. As for the nitrogen monooxide and nitrogen dioxide 50 cc. of the gas in the bag immediately after being deployed were collected by a syringe and were analyzed according to the method JIS K0104. As for the hydrogen cyanide 50 cc. of the gas in the bag were sucked by a vacuum pump through a 2% aqueous sodium hydroxide solution, and the cyanide ion absorbed in the sodium hydroxided solution was analyzed according to the method JIS K0102.

As for the metal residue one gram of the combustion residue was added to 5 ml. of concentrated hydrochloric acid, 7.5 ml. of concentrated nitric acid and 5 ml. of water and the mixture was heated for 10 to 20 minutes. After removing floating substances, the mixture solution was diluted with water to 250 ml. and analyzed by an atomic absorption spectroscope (made by Hitachi-Perkinelmer Co., Ltd.).

In order to determine the amount of the combustion residue which passed through the layer of wire gauzes and escaped into the bag, 10 liters of the gas in the bag after being inflated and deployed was sucked by a vacuum pump at a suction velocity of 10 liters/min. to pass through a millipore filter paper for catching dust, and the amount of the residue collected on the filter paper weighed 20 mg.

COMPARATIVE EXAMPLE 4

80 parts by strontium azide, 4 parts of boron and 16 parts of potassium perchlorate were thoroughly mixed in their powdered state and the resulting mixture was molded into cylindrical tablets of a diameter of 5 mm. and a thickness of 2 mm. in the same manner as in Example 4. When compressed tablets were discharged by the lower pestle, most of the tablets were ignited due to friction. Even when the ignition did not occur, which was rare, tablets of perfect shape were not produced. The friction sensitivity and hammer dropping impact sensitivity of the powdered mixture prior to tableting are shown in Table 7.

COMPARATIVE EXAMPLE 5

80 parts of strontium azide, 4 parts of boron, 16 parts of potassium perchlorate, 2 parts of a styrene-butadiene rubber consisting of styrene and butadiene in a weight ratio of 40 to 60 and 20 parts of toluene were throughly mixed in the same manner as in Comparative Example 1 and the resulting mixture was passed through a 40 mesh stainless steel wire gauze by a rubber spatula to give granules and then these granules were dried for 10 hours at 60°C. in hot air.

The resulting granules were molded into tablets in the same manner as in Example 8 without any ignition. The breaking strength of the tablets was 0.8 Kg. The friction sensitivity and hammer dropping impact sensitivity of the mixture prior to tableting are shown in Table 7.

In the same manner as in Example 8 the bag was inflated and deployed using 200 g. of the tablets and the gas composition in the bag and the amount of cyanide ion in the combustion residue were quantitatively analyzed. The results are shown in Tables 9 and 10.

EXAMPLE 9

80 parts of strontium azide, 8 parts of zirconium, 12 parts of potassium perchlorate and 3 parts of magnesium silicate ("Hifiller Talc No. 16", particle size: passed through a 325 mesh sieve, made by Matsumura Industry Co., Ltd.) were thoroughly mixed and the resulting mixture was molded into tablets in the same manner as in Example 8 without any ignition. The breaking strength of the tablets was 1.5 Kg. The friction sensitivity and hammer dropping impact sensitivity of the mixture prior to tableting are shown in Table 11.

In the same manner as in Example 8 the bag was inflated and deployed using 200 g. of the tablets. The period of time until the inner pressure of the bag amounted to 0.2 Kg./cm$^2$. gauge was 22 milliseconds and the time until the inner pressure of the bag amounted to the maximum was 43 milliseconds. The amount of cynide ion in the combustion residue was quantitatively analyzed in and was at most 0.2 p.p.m.

COMPARATIVE EXAMPLE 6

Example 9 was repeated to give tablets except that the magnesium silicate was not employed. Four to ten downward and upward reciprocating motions of pestles resulted in ignition and the resulting tablets were lacking in lateral luster and phase separation in the upper part of the tablets was also observed. The breaking strength of the tablets was 0.7 Kg.

EXAMPLE 10

85 parts of strontium azide, 7 parts of potassium nitrate and 5 parts of synthetic aluminum silicate $Al_2O_3(SiO_2)_2$, particle size; passed a 250 mesh sieves were thoroughly mixed and the resulting mixture was molded into tablets in the same manner as in Example 8 without any ignition. The breaking strength of the tablets was 1.2 Kg. The friction sensitivity and hammer dropping impact sensitivity of the mixture prior to tableting are shown in Table 11.

The same vibration test as in Example 8 was conducted and 0.4 percent by weight of the total tablets passed through a 20 mesh sieve.

In the same manner as in Example 8 the bag was inflated and deployed and the period of time until the inner pressure of the bag amounted to 0.2 $Kg./cm^2$. gauge was 27 milliseconds and the period of time until the inner pressure of the bag amounted to the maximum was 52 milliseconds. The amount of cynide ion in the combustion residue was quantitatively analyzed and was at most 0.2 p.p.m.

COMPARATIVE EXAMPLE 7

Example 10 was repeated to give tablets except that the synthetic aluminum silicate was not employed. Three to four downward and upward reciprocating motions of pestles resulted in ignition. The friction sensitivity and hammer dropping impact sensitivity of the powered mixture prior to tableting are shown in Table 11.

EXAMPLE 11

85 parts of strontium azide, 7 parts of zirconium, 8 parts of potassium perchlorate, 0.1 part of trilead tetraoxide and magnesium silicate ("Hifiller Talc No. 11", made by Matsumura Industry Co., Ltd.) in an amount set forth in Table 12 were thoroughly mixed and each of the resulting mixtures was molded into tablets in the same manner as in Example 8 and the tabletability of the mixtures and the breaking strength of the tablets are shown in Table 12.

In the same manner as in Example 8 the bag was inflated and deployed using the tablets. The period of time until the inner pressure of the bag amounted to 0.2 $Kg./cm^2$. gauge is shown in Table 12.

COMPARATIVE EXAMPLE 8

Example 11 was repeated except that the magnesium silicate was not employed and the result is shown in Table 12.

EXAMPLE 12

80 parts of strontium azide, 7 parts of aluminum, 13 parts of ferric oxide, 3 parts of aluminum silicate $Al_2O_3(SiO_2)_2$ and magnesium silicate having a variety of particle sizes ("Hilfiller Talc No. 11", made by Matsumura Industry Co., Ltd.) in an amount set forth in Table 13 were thoroughly mixed and each of the resulting mixtures was molded into tablets in the same manner as in Example 8. The tabletability of the mixtures and the breaking strength of the resulting tablets are shown in Table 13.

COMPARATIVE EXAMPLE 9

Example 12 was repeated except that the aluminum silicate and magnesium silicate were not employed. The tabletability of the mixture and the breaking strength of the tablets are shown in Table 13.

EXAMPLE 13

80 parts of barium azide, 3.4 parts of boron, 16.6 parts of potassium nitrate and magnesium aluminum silicate ($Al_2O_3.MgO.2SiO_2.XH_2O$, trade mark: "Zeopan", made by Fuji Chemical Industry Co., Ltd.) in an amount set forth in Table 14 were thoroughly mixed, and in the same manner as in Example 8 each of the resulting mixtures was molded into tablets and using the tablets the bag was inflated and deployed. The amount of cyanide ion in the combustion residue was quantitatively analyzed and was a trace. The tabletability of the mixtures and the breaking strength of the tablets are shown in Table 14.

EXAMPLE 14

80 parts of barium azide, 4 parts of boron, 16 parts of trilead tetraoxide, strontium hydroxide in an amount set forth in Table 15 and 5 parts of aluminum silicate were thoroughly mixed and each of the resulting mixtures was continuously molded into tablets by the same rotary tableting machine as in Example 1 and the tabletability of the mixtures and the breaking strength of the tablets are shown in Table 15.

In the same manner as in Example 8 using the tablets comprising 5 parts of strontium hydroxide except that a layer of stainless steel wire gauzes set forth in Table 16 was employed instead of the layer set forth in Table 8 the bag was inflated and deployed. The results are shown in Table 17.

EXAMPLE 15

85 parts of strontium azide, 3 parts of boron, 12 parts of potassium perchlorate 100 parts of water and the same water glass as in Example 4 in an amount set forth in Table 18 were thoroughly mixed for 30 minutes in a pulverizing and mixing machine of the Ishikawa type and each of the resulting mixtures was passed through a 40 mesh stainless steel wire gauze by a rubber spatula to give granules and these granules were dried at 60°C. for 2 hours in hot air.

The granules thus obtained were molded into tablets in the same manner as in Example 8 and the tablets had surface luster and were further dried at 60°C. for 5 hours. The breaking strength of the resulting tablets is shown in Table 18.

In the same manner as in Example 8 using the talets comprising 5 parts of the water glass the bag was inflated and deployed and the combustion residues were analyzed. The results are shown in Table 19.

EXAMPLE 16

80 parts of barium azide, 5 parts of silicon, 3 parts of boron, 13 parts of potassium nitrate, 100 parts of water and water glass ("No. 1", made by Takeda Chemical Industry Co., Ltd., $p=0$, $r/q=2.0$ to 2.4) in an amount set forth in Table 21 were thoroughly mixed for one hour in a pulverizing and mixing machine of the Ishikawa type and each of the resulting mixtures were passed through a 40 mesh stainless steel wire gauze to give granules and these granules were dried at 60°C. for 3 hours in hot air.

In the same manner as in Example 8 the resulting granules were molded into tablets, and using the tablets the bag was inflated and deployed. The period of time until the inner pressure of the bag amounted to 0.2

13

Kg./cm². gauge is shown in Table 20. The amount of cyanide ion in the combustion vessel was quantitatively analyzed and the results are shown in Table 20.

EXAMPLE 17

90 parts of strontium azide, 3 parts of aluminum powder, 7 parts of potassium perchlorate, 100 parts of water and potassium chloride and the water glass as in Example 16 in an amount set forth in Table 21 were thoroughly mixed in a pulverizing and mixing machine of the Ishikawa type and each of the resulting mixtures was passed through a 40 mesh stainless steel wire gauze to give granules and these granules were dried at 60°C. for 3 hours in hot air.

In the same manner as in Example 8 the resulting granules were molded into tablets, and using the tablets the bag was inflated and deployed. The period of time until the inner pressure of the bag amounted to 0.2 Kg./cm². gauge is shown in Table 21.

EXAMPLE 18

80 parts of strontium azide, 16 parts of potassium perchlorate, 4 parts of boron, 80 parts of toluene and 0.5 part (as rubber) of a silicon rubber solution (trade mark "KE-45-RTV", made by Shinetsu Chemical Co., Ltd.) were thoroughly mixed for 30 minutes in a pulverizing and mixing machine of Ishikawa type and extruded through a 60 mesh stainless steel wire gauze to give granules and these granules were dried at 60°C. for 10 hours in a hot air drier.

100 parts of the resulting granules were mixed with magnesium silicate in an amount set forth in Table 22 and each of the resulting mixtures was continuously molded into tablets by the same rotary tableting machine as in Example 1. The tabletability of the mixture and the breaking strength of the tablets are shown in Table 22.

In the same manner as in Example 8 using the tablets the bag was inflated and deployed and the combustion residue in the combustion vessel was collected and the amount of cynide ion was quantitatively analyzed. The results are shown in Table 22.

EXAMPLE 19

90 parts of strontium azide, 2 parts of boron, 8 parts of potassium perchlorate, 5 parts of the same water glass as in Example 16, 100 parts of water and 3 parts of each of the compounds set forth in Table 23 were thoroughly mixed for 30 minutes in a pulverizing and mixing machine of the Ishikawa type and each of the resulting mixtures was passed through a 40 mesh stainless steel wire gauze to give granules and these granules were dried at 50°C. for 3 hours in a hot air drier. The resulting granules were molded into tablets of a diameter 5 mm. and a thickness 3 mm. by the same rotary tableting machine as in Example 1.

In the same manner as in Example 8 using the tablets the bag was inflated and deployed and the combustion residue in the combustion vessel was collected and the amount of cyanide ion was quantitatively analyzed. The results are shown in Table 23.

EXAMPLE 20

80 parts of barium azide, 1 part of boron, 19 parts of trilead tetraoxide and potassium chloride in an amount set forth in Table 24 were thoroughly mixed and each of the resulting mixture was molded into tablets of a diameter 5 mm. and a thickness 3 mm. by the same tableting machine as in Example 1.

The breaking strength of the tablets and the tabletability of the mixtures are shown in Table 24.

When the potassium chloride was absent in the above-described composition it was impossible to effect tableting due to ignition after three to four downward and upward reciprocating motions of the pestles.

The friction sensitivity and hammer dropping impact sensitivity of the powdered mixtures prior to tableting are shown in Table 25.

The same vibration test as in Example 8 was conducted and 0.07 percent by weight of the total tablets passed through a 20 mesh sieve.

In a 140 c.c. cylindrical iron combustion vessel, the side wall of which was perforated with 200 circular outlet holes of a diameter 3 mm., and the outside of the side wall being provided with a layer of stainless steel wire gauzes set forth in Table 8, there were filled 200 g. of the tablets comprising 5 parts of potassium chloride and two ignition tubes, each containing the same ignition composition as in Example 8. The vessel was placed in a folded cylindrical polycaprolactam bag having a volume of 70 liters and the bag was inflated and deployed in the same manner as in Example 8. The period of time until the inner pressure of the bag amounted to 0.2 Kg./cm². gauge was 28 milliseconds and the period of time until the inner pressure of the bag amounted to the maximum was 60 milliseconds.

Then the combustion vessel was disassembled and the combustion residue was collected and the amount of cyanide ion and metal residue were quantitatively analyzed. The results are shown in Table 26. The gas composition in the inflated bag is shown in Table 27.

The residue escaped into the inflated bag through the layer of stainless steel wire gauzes was measured in the same manner as in Example 8 and was 18 mg.

EXAMPLE 21

90 parts of strontium azide, 4 parts of zirconium, 6 parts of potassium perchlorate and 5 parts of each of the compounds set forth in Table 28 were molded into tablets and tested, with the results there set forth.

In the following tables, the breaking strength was determined by putting a tablet between two plates in the direction of its diameter, pressing the tablet by a load and measuring the pressure at breaking.

The test of hammer dropping impact sensitivity is carried out according to the method described in "Industrial Explosive Handbook", edited in 1966 by the Industrial Explosive Society, Japan.

The test of friction sensitivity is carried out according to the method described in "Industrial Explosive Handbook", edited in 1966 by the Industrial Explosive Society, Japan using BAM as the friction testing machine.

Table 1

| Run No. | Water (parts) | Methanol (parts) | Alkaline compound (parts) | Degree of discoloration | Tabletability | Breaking strength of tablets (kg) |
|---|---|---|---|---|---|---|
| 1 | 10 | 90 | — | Pale yellow | good | 2.5 |

Table 1-continued

| Run No. | Water (parts) | Methanol (parts) | Alkaline compound (parts) | Degree of discoloration | Tabletability | Breaking strength of tablets (kg) |
|---|---|---|---|---|---|---|
| 2 | 20 | 80 | — | Pale yellow | do. | 3.1 |
| 3 | 50 | 50 | — | Yellow | do. | 3.5 |
| 4 | 70 | 30 | — | Yellow | do. | 3.7 |
| 5 | 100 | — | — | Deep yellow | do. | 3.7 |
| 6 | 50 | 50 | NaOH 1 | not discolored | do. | 3.2 |
| 7 | 50 | 50 | KHCO$_3$ 1 | not discolored | do. | 3.4 |

Table 2

| Run No. | Organic medium | Tabletability | Breaking strength of tablets (kg.) |
|---|---|---|---|
| 1 | Ethyl alcohol | Good | 4.2 |
| 2 | n-Propyl alcohol | do. | 3.2 |
| 3 | n-Butyl alcohol | do. | 4.5 |
| 4 | Methyl ether | do. | 4.8 |
| 5 | Methylethyl ether | do. | 3.5 |
| 6 | Ethyl ether | do. | 4.1 |
| 7 | Acetone | do. | 3.8 |
| 8 | Methylethyl ketone | do. | 3.5 |

Table 3

| Run No. | Water glass (parts) | Tabletability | Breaking strength of tablets (kg.) |
|---|---|---|---|
| 1 | 0.5 | Breaking-off of edge of tablets was observed in some cases. | 4.1 |
| 2 | 1.0 | Good | 5.2 |
| 3 | 2.0 | do. | 6.1 |
| 4 | 5.0 | do. | 7.7 |
| 5 | 10.0 | do. | 7.9 |

Table 4

| Run No. | Water glass (parts) | Degree of discoloration | Tabletability | Breaking strength of tablets (kg.) |
|---|---|---|---|---|
| 1 | 0.5 | Very slightly yellow | Good | 3.1 |
| 2 | 1.0 | Slightly yellow | do. | 4.2 |
| 3 | 2.0 | do. | do. | 4.7 |
| 4 | 10.0 | do. | do. | 5.2 |
| 5 | 15.0 | do. | do. | 6.7 |

Table 5

| Run No. | Water (parts) | Acetone (parts) | Tabletability | Breaking strength of tablets (kg.) |
|---|---|---|---|---|
| 1 | 10 | 90 | Good | 2.1 |
| 2 | 20 | 80 | do. | 2.5 |
| 3 | 30 | 70 | do. | 2.7 |
| 4 | 50 | 50 | do. | 3.2 |

Table 6

| Run No. | Water (parts) | Acetone (parts) | Tabletability | Breaking strength of tablets (kg.) |
|---|---|---|---|---|
| 1 | 10 | 90 | Good | 7.2 |
| 2 | 20 | 80 | do. | 7.9 |
| 3 | 30 | 70 | do. | 7.5 |
| 4 | 50 | 50 | do. | 7.9 |

Table 7

| Powdered gas generating composition | Friction sensitivity Probability of ignition* | Friction sensitivity Load (kg.) | Hammer dropping impact sensitivity (5 kg. of hammer) Probability of ignition* | Hammer dropping impact sensitivity (5 kg. of hammer) Height (cm.) |
|---|---|---|---|---|
| Example 8 | 1/6 | 6 | 1/6 | 40 |
| Comparative example 4 | 1/6 | 1 | 1/6 | 15 |
| Comparative example 5 | 1/6 | 10 | 1/6 | 40 |

*1/6 means the probability of ignition one time out of six tests.

Table 8

| Layer of stainless steel wire gauzes | | | |
|---|---|---|---|
| Mesh of wire gauge | | Number of repeating units | Arrangement |
| 20 Lbs. (inside) ↓ 100 Lbs. (outside) | } 1 unit | 4 | inside of layer |
| 60 Lbs. (inside) ↓ 100 Lbs. (outside) | } 1 unit | 4 | ↓ |
| 200 Lbs. | | 3 | ↓ |
| 300 Lbs. | | 3 | outside of layer |

Table 9

| Gas generating composition | Strontium (weight %) | Boron (weight %) | Analysis of combustion residue Potassium (weight %) | Aluminum (weight %) | Silicon (SiO$_2$) (weight %) | Cyanide in (weight %) |
| --- | --- | --- | --- | --- | --- | --- |
| Example 8 | 71.0 | 6.8 | 8.1 | 1.8 | 2.2 | A trace |
| Comparative example 5 | 72.0 | 7.1 | 8.5 | — | — | 0.8 |

Table 10

| Gas generating composition | Gas composition in bag | | | | | | |
| --- | --- | --- | --- | --- | --- | --- | --- |
| | Molecular nitrogen (volume %) | Molecular oxygen (volume %) | Carbon monoxide (volume %) | Methane (volume %) | Carbon dioxide (volume %) | Nitrogen oxides (volume %) | Hydrogen cyanide (volume %) |
| Example 8 | 95.8 | 4.2 | A trace | A trace | A trace | Not detected | 0.00004 |
| Comparative example 5 | 94.0 | 5.1 | 0.7 | 0.2 | A trace | 0.0005 | 0.0003 |

Table 11

| Run No. | Powdered gas generating composition | Friction sensitivity Probability of ignition | Load (Kg.) | Hammer dropping impact sensitivity (5 Kg. of hammer) Probability of ignition | Height (cm.) |
| --- | --- | --- | --- | --- | --- |
| 1 | Example 9 | 1/6 | 8 | 1/6 | 30 |
| 2 | Example 10 | 1/6 | 16 | 1/6 | 30 |
| 3 | Comparative example 6 | 1/6 | 2 | 1/6 | 15 |
| 4 | Comparative example 7 | 1/6 | 8 | 1/6 | 10 |

Table 12

| Run No. | Magnesium silicate (parts) | Tabletability | Breaking strength of tablet (Kg.) | Period of time required until inner pressure of bag amounts to 0.2 Kg./cm$^2$. gauge (milliseconds) |
| --- | --- | --- | --- | --- |
| 1 | 0.2 | Fairly good | 0.5 | 32.5 |
| 2 | 0.5 | Good | 0.7 | 32.0 |
| 3 | 1.0 | do. | 0.8 | 33.0 |
| 4 | 2.0 | do. | 0.9 | 35.0 |
| 5 | 5.0 | Phase separation was observed in some tablets | 0.5 | 37.0 |
| Comparative example 8 | 0 | Ignited | 0.3 | 32.0 |

Table 13

| Run No. | Amount (parts) | Particle size (passed mesh size) | Tabletability | Breaking strength of tablet (Kg.) |
| --- | --- | --- | --- | --- |
| 1 | 0.2 | 350 Lbs. | Good | 1.0 |
| 2 | 0.5 | do. | do. | 1.2 |
| 3 | 1.0 | do. | do. | 1.5 |
| 4 | 2.0 | do. | do. | 1.1 |
| 5 | 1.0 | 200 Lbs. | do. | 0.8 |
| Comparative example 9 | 0 | — | Gas generating composition tended to stick to pestles and tablets were easy to break | 0.4 |

Table 14

| Run No. | Magnesium aluminum silicate (parts) | Tabletability | Breaking strength of tablets (Kg.) | Cyanide ion in combustion residue |
|---|---|---|---|---|
| 1 | 2 | Phase separation was rarely observed in tablets. | 0.8 | a trace |
| 2 | 5 | Gas generating composition had good moldability and tablets had good surface gloss. | 1.2 | do. |
| 3 | 10 | do. | 1.8 | do. |

Table 15

| Run No. | Strontium hydroxide (parts) | Tabletability | Breaking strength of tablets (Kg.) |
|---|---|---|---|
| 1 | 5 | Tablets had good surface gloss. | 1.2 |
| 2 | 10 | do. | 1.8 |
| 3 | 15 | do. | 2.8 |

Table 16

| | Layer of stainless steel wire gauzes | | | |
|---|---|---|---|---|
| | Mesh of wire gauzes | | Number of repeating units | Arrangements |
| Plain weave wire gauzes | 20 lbs. (inside)<br>40 lbs.<br>100 lbs. (outside) | 1 unit | 4 | inside of layer |
| | 60 lbs. (inside)<br>40 lbs. (outside) | 1 unit | 4 | |
| Twilled mat-like weave<br>warp: 0.21 mm. in diameter × 5 | 32 lbs. | 1 unit | 3 | |
| woof: 0.17 mm. in diameter × 7 | 32 lbs.<br>300 lbs. | | 4 | outside of layer |

Table 17

| Gas generating composition | Molecular nitrogen (volume %) | Molecular oxygen (volume %) | Gas composition in bag | | | | | Cyanide ion in combustion residue | Amount of combustion residue escaped into bag* (mg.) |
|---|---|---|---|---|---|---|---|---|---|
| | | | Carbon monooxide (volume %) | Methane (volume %) | Nitrogen monooxide (volume %) | Nitrogen dioxide (volume %) | Hydrogen cyanide (volume %) | | |
| Run No. 1 in Example 14 | 95.5 | 4.5 | 0.006 | a trace | a trace | a trace | a trace | a trace | 18 |

*per 10 liters of gas in bag

Table 18

| Run No. | Water/gloss (parts) | Tabletability | Breaking strength of tablets (Kg.) | Cyanide ion combustion residue |
|---|---|---|---|---|
| 1 | 0.5 | Phase separation was rarely observed in tablets | 2.2 | Not detected |
| 2 | 1.0 | Good | 4.0 | do. |
| 3 | 2.0 | do. | 8.1 | do. |
| 4 | 5.0 | do. | 9.5 | do. |
| 5 | 10.0 | do. | 9.8 | do. |

Table 19

| Gas generating composition | Analysis of combustion residue | | | | |
|---|---|---|---|---|---|
| | Strontium (weight %) | Potassium (weight %) | Boron (weight %) | Silicon (weight %) | Sodium (weight %) |
| Run No. 4 in Example 15 | 79.0 | 6.2 | 5.5 | 1.6 | 1.3 |

Table 20

| Run No. | Water glass (parts) | Tabletability | Breaking strength of tablets (Kg.) | Cyanide ion in combustion residue | Period of time until inner pressure of bag amounts to 0.2 Kg./cm². gauge (milliseconds) |
|---|---|---|---|---|---|
| 1 | 0.5 | Phase separation was rarely observed. | 2.0 | Not detected | 25.0 |
| 2 | 1.0 | Good | 2.8 | do. | 25.5 |
| 3 | 2.0 | do. | 5.4 | do. | 26.2 |
| 4 | 5.0 | do. | 6.7 | do. | 28.1 |
| 5 | 10.0 | do. | 8.1 | do. | 35.0 |

Table 21

| Run No. | Potassium chloride (parts) | Water glass (parts) | Tabletability | Breaking strength of tablets (Kg.) | Period of time required until inner pressure of bag amounts to 0.2 Kg./cm² gauge (milliseconds) |
|---|---|---|---|---|---|
| 1 | 0 | 1.0 | Good | 3.2 | 29.0 |
| 2 | 5 | 1.0 | do. | 5.0 | 31.0 |
| 3 | 0 | 5.0 | do. | 4.4 | 32.5 |
| 4 | 5 | 5.0 | do. | 8.7 | 36.0 |

Table 22

| Run No. | Magnesium silicate (parts) | Tabletability | Breaking strength of tablets (Kg.) | Cyanide ion in combustion residue (weight %) |
|---|---|---|---|---|
| 1 | 0 | Tablets lacked in lateral gloss | 0.7 | 0.02 |
| 2 | 0.2 | Tablets and a slight lateral gloss | 0.7 | 0.02 |
| 3 | 0.4 | Tablets had surface and lateral gloss | 0.9 | 0.01 |
| 4 | 1.0 | do. | 0.6 | 0.01 |

Table 23

| Run No. | Compound (parts) | Tabletability | Breaking strength of tablets (Kg.) | Cyanide ion in combustion residue |
|---|---|---|---|---|
| 1 | KCl | Good | 6.4 | Not detected |
| 2 | KBr | do. | 6.3 | do. |
| 3 | $CaCl_2$ | do. | 6.0 | do. |
| 4 | $SrCl_2$ | do. | 6.8 | do. |
| 5 | NaBr | do. | 6.5 | do. |
| 6 | $Sr(OH)_2$ | do. | 7.2 | do. |

Table 24

| Run No. | Potassium chloride (parts) | Tabletability | Breaking strength of tablets (Kg.) |
|---|---|---|---|
| 1 | 0.2 | Ignition was observed during tableting in some cases. | 2.0 |
| 2 | 0.5 | Breaking-off of edge of tablets was rarely observed. | 2.4 |
| 3 | 1.0 | Good | 2.5 |
| 4 | 2.0 | do. | 2.5 |
| 5 | 5.0 | do. | 2.7 |
| 6 | 10.0 | do. | 3.0 |
| 7 | 20.0 | do. | 3.1 |

Table 25

| Run No. | Gas generating composition | Friction sensitivity Probability of ignition | Friction sensitivity Load (Kg.) | Hammer dropping impact sensitivity (5 Kg. of hammer) Probability of ignition | Hammer dropping impact sensitivity (5 Kg. of hammer) Height (cm.) |
|---|---|---|---|---|---|
| 1 | Run No. 3 in Example 20 | 1/6 | 4 | 1/6 | 30 |
| 2 | Run No. 4 in Example 20 | 1/6 | 6 | 1/6 | 40 |
| 3 | Run No. 5 in | 1/6 | 6 | 1/6 | 40 |

Table 25-continued

| Run No. | Gas generating composition | Friction sensitivity Probability of ignition | Friction sensitivity Load (Kg.) | Hammer dropping impact sensitivity (5 Kg. of hammer) Probability of ignition | Hammer dropping impact sensitivity (5 Kg. of hammer) Height (cm.) |
|---|---|---|---|---|---|
| 4 | Example 20 Example 20 without potassium chloride | 1/6 | 1 | 1/6 | 15 |

Table 26

| Gas generating composition | Analysis of combustion residue | | | | |
|---|---|---|---|---|---|
| | Barium (weight %) | Boron (weight %) | Lead (weight %) | Potassium (weight %) | Cyanide ion (weight %) |
| Run No. 5 in Example 21 | 68.0 | 23.7 | 1.9 | 2.5 | 0 |

Table 27

| Gas generating composition | Gas composition in bag | | | | | | |
|---|---|---|---|---|---|---|---|
| | Molecular nitrogen (volume %) | Molecular oxygen (volume %) | Carbon monoxide (volume %) | Carbon dioxide (volume %) | Methane (volume %) | Nitrogen oxides (volume %) | Hidrogen cyanide (volume %) |
| Run No. 5 in Example 21 | 96.2 | 3.0 | 0.05 | Not detected | 0.05 | Not detected | Not detected |

Table 28

| Run No. | Compound | Tabletability | Breaking strength of tablets (Kg.) | Friction sensitivity Probability of ignition | Friction sensitivity Load (Kg.) | Hammer dropping impact sensitivity (5 Kg. of hammer) Probability of ignition | Hammer dropping impact sensitivity (5 Kg. of hammer) Height (cm.) |
|---|---|---|---|---|---|---|---|
| 1 | KCl | Good | 2.8 | 1/6 | 6 | 1/6 | 40 |
| 2 | KBr | do. | 2.1 | 1/6 | 4 | 1/6 | 30 |
| 3 | CaCl$_2$ | do. | 2.2 | 1/6 | 6 | 1/6 | 50 |
| 4 | SrCl$_2$ | do. | 2.7 | 1/6 | 6 | 1/6 | 40 |
| 5 | NaBr | do. | 1.7 | 1/6 | 6 | 1/6 | 40 |
| 6 | Sr(OH)$_2$ | do. | 2.5 | 1/6 | 2 | 1/6 | 20 |
| 7 | None | Ignited | — | 1/6 | 2 | 1/6 | 20 |

What is claimed is:

1. A gas generating composition comprising:

I. at least one metal azide compound selected from the group consisting of alkali metal azides, alkaline earth metal azides and hydroxy metal azides having the general formula $$M(OH)_m(N_3)_n$$

wherein

M represents magnesium, calcium, strontium, zinc, boron, aluminum, silicon, tin, titanium, zirconium, magnesium, chromium, cobalt or nickel; $(m + n)$ represents an atomic valency of M; and $m$ and $n$ represent a positive number, respectively, II. at least one oxidizing agent or a combustion composition comprising at least one oxidizing agent and at least one reducing agent; and III. at least one compound selected from the group consisting of a compound of the formula $$(Al_2O_3)_p(M_xO)_q(SiO_2)_r \cdot sH_2O$$

wherein

M represents lithium, sodium, potassium, strontium, magnesium or calcium; $x$ is 1 or 2; $p$ and $q$ represent zero or a positive number, respectively but $p$ and $q$ are not zero simultaneously; $r$ is a positive number; and $s$ is zero or a positive number, potassium chloride, potassium bromide, calcium chloride, sodium bromide, strontium chloride and strontium hydroxide, in an amount of from about 0.5 to 30 parts by weight based on 100 parts by weight of the total of the metal azide compound (I) and the oxidizing agent or the combustion composition (II).

2. A gas generating composition according to claim 1, wherein the metal azide compound is selected from the group consisting of strontium azide, barium azide and sodium azide.

3. A gas generating composition according to claim 1, wherein the oxidizing agent is selected from the group consisting of lithium perchlorate, potassium perchlorate, ammonium perchlorate, sodium perchlorate, potassium chlorate, potassium bromate, potassium nitrate, barium nitrate, lithium peroxide, sodium peroxide, potassium peroxide, barium peroxide, lead peroxide, manganese dioxide, ferric oxide, ferrosoferric oxide, lead oxide, chromium trioxide and trilead tetraoxide.

4. A gas generating composition according to claim 1, wherein the reducing agent is selected from the group consisting of zirconium, magnesium, boron, aluminum, silicon, ferro-silicon, titanium and manganese.

5. A gas generating composition according to claim 1, wherein the compound of the formula $(Al_2O_3)_p(M_xO)_q(SiO_2)_r \cdot sH_2O$ is selected from the group consisting of $(Na_2O)_q(SiO_2)_r \cdot sH_2O$, $(K_2O)_q(SiO_2)_r \cdot sH_2O$, $(Li_2O)_q(SiO)_r \cdot sH_2O$, $(Al_2O_3)_p(SiO_2)_r \cdot sH_2O$, $(MgO)_q(SiO_2)_r \cdot sH_2O$, $(Al_2O_3)_p(MgO)_q(SiO_2)_r \cdot sH_2O$, $(Al_2O_3)_p(K_2O)_q(SiO_2)_r \cdot sH_2O$, $(Al_2O_3)_p(Na_2O)_q(SiO_2)_r \cdot sH_2O$ and $(Al_2O_3)_p(CaO)_q(SiO_2)_r \cdot sH_2O$ wherein $p$, $q$ and $r$ each is a positive number.

6. A method of preparing gas generating compression-molded articles which comprises adding about 7 to 300 parts by weight of water to about 100 parts by weight of a gas generating composition comprising:

I. at least one metal azide compound selected from the group consisting of alkali metal azides, alkaline earth metal azides and hydroxy metal azides having the general formula $M(OH)_m(N_3)_n$ wherein M represents magnesium, calcium, strontium, zinc, boron, aluminum, silicon, tin, titanium, zirconium, magnesium, chromium, cobalt or nickel;

$(m + n)$ represents an atomic valency of M; and $m$ and $n$ represent a positive number, respectively, II. a least one oxidizing agent or a combustion composition comprising at least one oxidizing agent and at least one reducing agent; and III. at least one compound selected from the group consisting of a compound of the formula $(Al_2O_3)_p(M_xO)_q(SiO_2)_r \cdot sH_2O$ wherein M represents lithium, sodium, potassium, strontium, magnesium or calcium; $x$ is 1 or 2; $p$ and $q$ represent zero or a positive number, respectively but $p$ and $q$ are not zero simultaneously; $r$ is a positive number; and $s$ is zero or a positive number, potassium chloride, potassium bromide, calcium chloride, sodium bromide, strontium chloride and strontium hydroxide, in an amount of from about 0.5 to 30 parts by weight based on 100 parts by weight of the total of the metal azide compound (I) and the oxidizing agent or the combustion composition (II), forming the resulting mixture into granules, drying the granules and subjecting the dried granules to compression molding.

7. A method according to claim 6, wherein about 7 to 300 parts by weight of an organic medium soluble in or miscible with water selected from the group consisting of aliphatic alcohols having 1 to 6 carbon atoms, aliphatic ketones having 3 to 5 carbon atoms and aliphatic ethers having 2 to 5 carbon atoms is employed together with water.

8. A method according to claim 7, wherein the gas generating composition contains about 0.1 to 5 parts by weight of an alkaline compound selected from the group consisting of lithium hydroxide, sodium hydroxide, potassium hydroxide, strontium hydroxide, barium hydroxide, lithium carbonate, sodium carbonate, potassium carbonate, strontium carbonate, lithium hydrogenbicarbonate, sodium hydrogenbicarbonate and potassium hydrogenbicarbonate.

9. A method according to claim 6, wherein the compound of the formula $(Al_2O_3)_p(M_xO)_q(SiO_2)_r \cdot sH_2O$ is selected from the group consisting of $(Na_2O)_q(SiO_2)_r \cdot sH_2O$, $(K_2O)_q(SiO_2)_r \cdot sH_2O$, $(Li_2O)_q(SiO_2)_r \cdot sH_2O$, $(Al_2O_3)_p(SiO_2)_r \cdot sH_2O$, $(MgO)_q(SiO_2)_r \cdot sH_2O$, $(Al_2O_3)_p(MgO)_q(SiO_2)_r \cdot sH_2O$, $(Al_2O_3)_p(K_2O)_q(SiO_2)_r \cdot sH_2O$, $(Al_2O_3)_p(Na_2O)_q(SiO_2)_r \cdot sH_2O$ and $(Al_2O_3)_p(CaO)_q(SiO_2)_r \cdot sH_2O$ wherein $p$, $q$ and $r$, each is a positive number.

* * * * *

UNITED STATES PATENT OFFICE
CERTIFICATE OF CORRECTION

Patent No. 3,920,575            Dated November 18, 1975

Inventor(s) Takihiko Shiki et al.

It is certified that error appears in the above-identified patent and that said Letters Patent are hereby corrected as shown below:

Column 5, line 8, "valve" should read -- value --.

line 19, "carbom" should read -- carbon --.

Column 8, line 51, "Fuju" should read -- Fuji --.

line 53, "hydroxided" should read -- hydroxide --.

Column 11, line 5, "sieves" should read -- sieve, --.

Column 11, line 31, "powered" should read -- powdered --.

Column 12, line 49, "talets" should read -- tablets --.

Column 16, Table 8; Column 17, Table 13; Column 19, Table 16; "lbs" should read -- # --.

Column 19, Table 16, bottom bracket should encompass only 32 # and 32# . 300# stands outside brackets.

Signed and Sealed this

Sixth Day of December 1977

[SEAL]

Attest:

RUTH C. MASON          LUTRELLE F. PARKER
*Attesting Officer*      *Acting Commissioner of Patents and Trademarks*